Patented Apr. 29, 1941

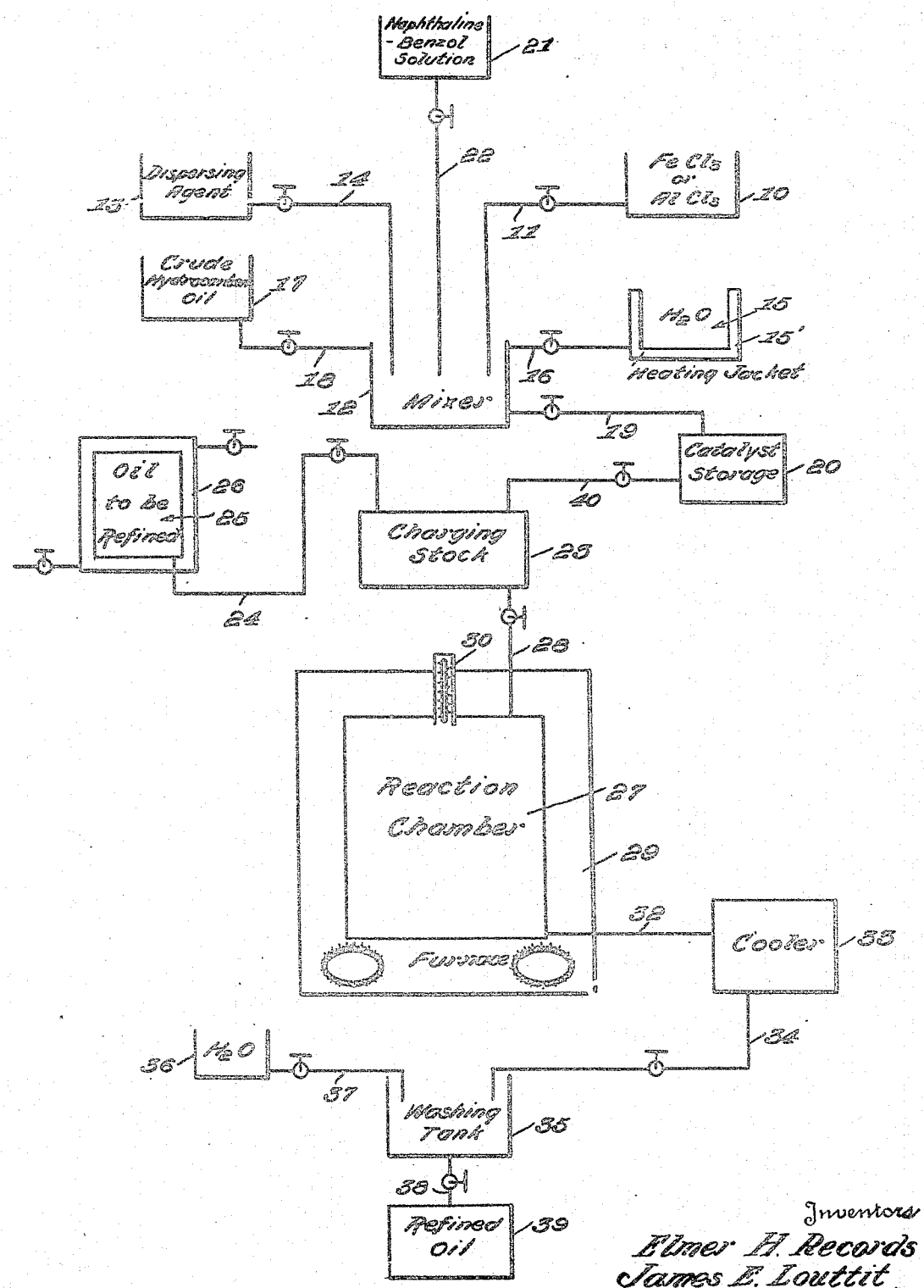

2,239,859

UNITED STATES PATENT OFFICE 2,239,859

METHOD OF PURIFYING HYDROCARBON OILS

Elmer H. Records and James E. Louttit, Tacoma, Wash.

Application August 16, 1938, Serial No. 225,142

8 Claims. (Cl. 196—26)

This invention relates to a process for purifying hydrocarbon oils, such as crude petroleum, cracked petroleum products and residuum bottoms, and it is the principal object of this invention to provide a simple process for treating such crude hydrocarbon oil whereby to so convert the forms of sulphur contained therein that they may be easily removed. More specifically, the invention resides in the process whereby the forms of sulphur are removed by washing with proper reagents, to leave a hydrocarbon oil that is substantially free of sulphur and sulphur compounds; this process being applicable not only with crude hydrocarbon oils, but also with various forms of residuums from cracked petroleum oils and the various fractions distilled therefrom.

This process is based upon the fact that many crude petroleum oils contain sulphur in various forms, which, if not removed, pass on into the distillates when the oil is treated, and the fact that it is advantageous to remove a large portion of such sulphur compounds from the crude hydrocarbon before subsequent treatment for the production of petroleum products.

An apparatus for carrying out the process of the present invention is diagrammatically shown in the drawing.

In carrying out the process, we first prepare a catalyst in the following manner: A salt solution consisting of a chloride of a metal, as for example ferric chloride or aluminum chloride is delivered from the receptacle 10 containing it through a pipe 11 into a mixer 12. A suitable dispersing agent such as "Intramine" or some form of sulfonated oil such as sulfonated castor oil contained in receptacle 13 is delivered to the mixer 12 through the pipe 14. "Intramine" is the trade name for designating the compounds of o,o′ dithiobisanaline. When the salt and dispensing agent have been thoroughly mixed, water from the tank 15 heated to the desired temperature by means of heating jacket 15′ is delivered to the mixer 12 through the pipe 16 in an amount sufficient to dissolve the mixture of the salt and dispersing agent. A small quantity of the oil to be treated contained in the tank 17 is then delivered to the mixer 12 through the pipe 18 so as to thoroughly emulsify the mass. The emulsified mass of catalyst is then discharged from the mixer 12 through the pipe 19 in the catalyst storage tank 20.

With certain types of hydrocarbon oils we have found it advantageous to add to the catalyst a determined amount of crude naphthalene. The naphthalene so used is first dissolved in benzol. In this case, the naphthalene-benzol solution is preferably added to the metallic salt solution and the dispersing agent. This is done by delivering such solution from the tank 21 containing it through the pipe 22 into the mixer 12.

The emulsified mass of catalyst in the required amount is discharged from the storage tank 20 through the pipe 40 into the charging stock tank 23. Into this same tank 23 is next delivered through the pipe 24 the required amount of the hydrocarbon oil to be treated or refined from the tank 25 containing it, and hydrocarbon oil and catalyst thoroughly mixed. This mass forms the charging stock for introduction in the reaction chamber to be subsequently described. By reference to the drawing it will be apparent that the tank 25 is provided with a steam heating jacket 26 for the purpose of preheating the oil, if desired.

The advantage of our method of preparing the catalyst and hydrocarbon oil is that complete dispersion of the catalyst in the crude oil is brought about, and under the subsequent heat treatment, decomposition of the sulfur compounds is accelerated.

The mixture of catalyst and hydrocarbon oil is introduced into the reaction chamber 27 from the charging stock tank 23 through the pipe 28 wherein it is heated to a temperature of between 300° F. and 800° F., bringing about reactions wherein the sulfur contained in the crude hydrocarbon is so transformed or decomposed as to make the removal of such sulfur easy and practicable. As shown in the drawing, the reaction chamber is disposed within a furnace 29 and is heated by radiation. Also, the reaction chamber 27 is provided with a thermometer 30.

The thus treated mass is discharged from the reaction chamber 27 through pipe 32 into a cooler 33 wherein it is cooled. From the cooler 33 the treated mass is discharged through the pipe 34 into a washing tank 35 wherein it is subjected to a washing with water to remove the sulfur compounds decomposed by the reactions of our process and the catalyst remaining therein. The water for use in the tank 35 is delivered from the water tank 36 through the pipe 37. After completion of the washing, the refined oil is delivered through the pipe 38 into the refined oil storage tank 39.

In charging the reaction chamber, our process is more easily performed if the relation between the amount of liquid charged and the expansion space provided adjacent thereto is of the approximate relation of one to five.

In the operation of our method it is also desirable to preheat the hydrocarbon oil slightly by some form of heat exchanger, and charging the preheated mixture of hydrocarbon oil and catalyst direct to the reaction retort. It is not compulsory, however, that heating prior to mixture with the catalyst be adopted to bring about the purification of the hydrocarbon oil under our method, as the method we use of emulsifying oil and catalyst can be begun with oil at normal temperatures.

Prompt removal of the heat treated hydrocarbon oil from the reaction chamber and rapid cooling thereof has been found to be advantageous to our method.

The type of reaction vessel or chamber required by our method can be of drum, or multiple pipe type; heated by a suitable furnace of such a design that the radiant heat of the furnace is utilized. A type of multiple pipe retort connected to a charging cylinder at the lower end thereof in which there can be inserted electric heating elements of the insert type is also applicable. Although we prefer the above types of reaction retorts our invention is applicable to various other forms of heating furnaces, wherein hydrocarbon oils may be enclosed for the proper heating thereof.

A distinct advantage of our method is that no carbon is deposited in the reaction chamber and the amount of gases formed are very slight.

We have found through repeated tests and experimentation that our method is applicable to hydrocarbon oils containing variable percentages of total sulfur.

The time required to bring about the reactions desired from the heating of the oil and catalyst is dependent upon the type of hydrocarbon oil under treatment. It is desired to heat to required temperature as rapidly as possible.

The term "hydrocarbon oil" as used herein includes all hydrocarbon oils of mineral origin.

Having thus described our invention, what we claim as new therein and desire to secure by Letters Patent is—

1. The method of refining hydrocarbon oils containing sulfur compounds which comprises treating said hydrocarbon oil with a catalyst including a metal salt selected from the group consisting of ferric chloride, aluminum chloride, and a dispersing agent consisting of sulfonated castor oil, at an elevated temperature to convert the sulfur compounds into soluble form.

2. The method of refining hydrocarbon oils containing sulfur compounds which comprises treating said hydrocarbon oil with a catalyst including a metal salt selected from the group consisting of ferric chloride, aluminum chloride, and a dispersing agent consisting of sulfonated castor oil at a temperature between 300° F. and 800° F. to convert the sulfur compounds into soluble form.

3. The method of refining hydrocarbon oils containing sulfur compounds which comprises treating said hydrocarbon oil with a catalyst including naphthalene, a metal salt selected from the group consisting of ferric chloride, aluminum chloride, and a dispersing agent consisting of sulfonated castor oil at an elevated temperature to convert the sulfur compounds into soluble form.

4. The method of refining hydrocarbon oils containing sulfur compounds which comprises treating said hydrocarbon oil with a catalyst including naphthalene, a metal salt selected from the group consisting of ferric chloride, aluminum chloride, and a dispersing agent consisting of sulfonated castor oil, at a temperature between 300° F. and 800° F.

5. The method of refining hydrocarbon oils containing sulfur compounds which comprises treating said hydrocarbon oil with a catalyst including a metal salt selected from the group consisting of ferric chloride, aluminum chloride, and a dispersing agent consisting of sulfonated castor oil, at an elevated temperature to convert the sulfur compounds into soluble form, and washing the thus treated oil to remove the sulfur soluble compounds therefrom.

6. The method of refining hydrocarbon oils containing sulfur compounds which comprises treating said hydrocarbon oil with a catalyst including a metal salt selected from the group consisting of ferric chloride, aluminum chloride, and a dispersing agent consisting of sulfonated castor oil, at a temperature between 300° F. and 800° F. to convert the sulfur compounds into soluble form, and treating the thus treated oil with water to remove the sulfur soluble compounds therefrom.

7. The method of refining hydrocarbon oils containing sulfur compounds which comprises treating said hydrocarbon oil with a catalyst including a metal salt selected from the group consisting of ferric chloride, aluminum chloride, and a dispersing agent consisting of sulfonated castor oil, at a temperature between 300° F. and 800° F. to convert the sulfur compounds into soluble form, cooling the thus treated oil, and washing the cooled treated oil with water to remove the sulfur soluble compounds therefrom.

8. The method of refining hydrocarbon oils containing sulfur compounds which comprises treating said hydrocarbon oil with a catalyst including naphthalene, a metal salt selected from the group consisting of ferric chloride, aluminum chloride, and a dispersing agent consisting of sulfonated castor oil, at a temperature between 300° F. and 800° F. to convert the sulfur compounds into soluble form, and treating the thus treated oil with water to remove the sulfur soluble compounds therefrom.

ELMER H. RECORDS.
JAMES E. LOUTTIT.